(12) United States Patent
Friedman et al.

(10) Patent No.: US 9,030,936 B2
(45) Date of Patent: May 12, 2015

(54) FLOW CONTROL WITH REDUCED BUFFER USAGE FOR NETWORK DEVICES

(71) Applicant: Intel Corporation, Santa Clara, CA (US)

(72) Inventors: Ben-zion Friedman, Jerusalem (IL); Eliezer Tamir, Bait Shemesh (IL)

(73) Assignee: Intel Corporation, Santa Clara, CA (US)

( * ) Notice: Subject to any disclaimer, the term of this patent is extended or adjusted under 35 U.S.C. 154(b) by 63 days.

(21) Appl. No.: 13/915,857

(22) Filed: Jun. 12, 2013

(65) Prior Publication Data

US 2014/0369194 A1 Dec. 18, 2014

(51) Int. Cl.
*G01R 31/08* (2006.01)
*H04L 12/823* (2013.01)

(52) U.S. Cl.
CPC ..................................... *H04L 47/32* (2013.01)

(58) Field of Classification Search
None
See application file for complete search history.

(56) References Cited

U.S. PATENT DOCUMENTS

| 6,084,856 | A * | 7/2000 | Simmons et al. | 370/235 |
| 6,496,516 | B1 * | 12/2002 | Dabecki et al. | 370/460 |
| 6,754,179 | B1 * | 6/2004 | Lin | 370/235 |
| 2005/0270976 | A1 * | 12/2005 | Yang et al. | 370/229 |

* cited by examiner

*Primary Examiner* — Duc C Ho
(74) *Attorney, Agent, or Firm* — Law Office of R. Alan Burnett, P.S (57) ABSTRACT

Methods and apparatus for implementing flow control with reduced buffer usage for network devices. In response to detection of flow control events, transmission of a data unit or segment such as an Ethernet frame is preempted in favor of a flow control message, resulting in aborting transmission of the frame. Data corresponding to the entirety of the frame is buffered at the transmitting station until the frame has been transmitted (or after a delay), enabling retransmission of the aborted frame. Preemption of frames in favor of flow control messages results in earlier responses to flow control events, enabling the size of buffers to be reduced.

32 Claims, 8 Drawing Sheets

FLOW CONTROL WITH REDUCED BUFFER USAGE FOR NETWORK DEVICES

FIELD OF THE INVENTION

The field of invention relates generally to computer networking and, more specifically but not exclusively relates to techniques for implementing flow control with reduced buffer usage for network devices.

BACKGROUND INFORMATION

Access to computer networks has become a ubiquitous part of today's computer usage. Whether accessing a Local Area Network (LAN) in an enterprise environment to access shared network resources, or accessing the Internet via the LAN or other access point, it seems users are always logged on to at least one service that is accessed via a computer network. Moreover, the rapid expansion of cloud-based services has lead to even further usage of computer networks, and these services are forecast to become ever-more prevalent.

At a basic level, network communication is facilitated through "links" between a pair of link partners. For example, in Ethernet links are used in LANs to facilitate communication between two devices coupled at opposing ends of the link, such as a computer and an Ethernet switch or hub. These links are bi-directional, duplex links. For each direction, a packetized stream of data is sent from a transmitter of a sending device to a receiver of a receiving device. Ethernet switches have multiple ports and are connected to multiple devices, while each "endpoint" device may have one or more physical network ports that are connected at an opposing end to a switch, another endpoint, or another type of network element.

To facilitate efficient use of network bandwidth, various flow control mechanism are used. For example, during network communication between a transmitter and a receiver, one or more flow control mechanisms may be used to ensure the transmitter does not overwhelm the receiver with data. As packets are received they are temporarily buffered by the receiver in connection with receiver-side processing of the packets; depending on how the packets are to be handled and other considerations, such as port and/or device congestion, the buffer resources may be insufficient to support the transmitter send rate, forcing received packets to be discarded (commonly referred to as "dropping" packets). The two most common schemes are point-to-point flow control (e.g., using Media Access Channel (MAC) flow control datagrams) and end-to-end credit based flow control (e.g., through use of a Transmission Control Protocol (TCP) transmit window). On an Ethernet link, point-to-point flow control is used between each pair of link partners. Further details of priority flow control are available at http://en.wikipedia.org/wiki/Ethernet_flow_control.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION

Embodiments of methods and apparatus for implementing flow control with reduced buffer usage for network devices are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Flow control is a difficult problem, especially when the network topology is complex. To reduce the occurrence of dropped packets, Network Interface Controllers (NICs) and switches are configured with buffer resources that are sized for worst-case conditions, and are often under-utilized. Under point-to-point flow control, an overwhelmed receiver reacts by sending flow control messages back to the transmitter requesting the transmitter temporarily pause transmission of data to the receiver. This results in additional traffic on the link, and may result in deadlocks when the receivers at both ends of the link are overwhelmed. As the complexity of the network topology increases, there are more points where congestion may occur, leading to a greater occurrence of flow control messages and/or dropped packets. These problems are exacerbated at switches, since receiving a pause on a single busy port can cause the switch to transmit pause packets on multiple ports, amplifying the issue.

To be lossless, the receiver needs to guarantee enough buffering to compensate for the time it takes for the transmitter to receive and act upon a flow control message. Under one approach, in order to do that it maintains high and low thresholds (often called "watermarks"). When the upper threshold is reached the receiver transmits "pause" frames and stops when the lower threshold has been reached. Typically the buffer space reserved by the high watermark is two jumbo frames per link (or per link per lossless traffic type), because in the receiver (which now needs to transmit a "pause") the flow control message could be waiting for a jumbo frame to finish transmitting before it can be sent, the transmitter that now needs to stop sending might have just started to send a second jumbo frame that needs to be completed before the pause can take effect.

FIGS. 1a-1d illustrate an example of the foregoing situation, and how it is handled using a conventional approach. In this example, stations A and B are linked in communication via a link 100, such as an Ethernet link. To support communication over link 100, each of stations A and B have applicable Transmitter (Tx) and Receiver (Rx) components, as depicted by receivers 102a and 102b, and transmitters 104a and 104b. Each of stations A and B also have two buffer pools—an Rx buffer pool and a Tx buffer pool, as depicted by Rx buffer pools 106a and 106b and Tx buffer pool 108a and 108b.

As further illustrated, each of Rx buffer pools 106a and 106b includes buffers that are used for handling different classes of service, labeled "Class 1" and "Class 2" in the Figures herein. Generally, each Rx buffer pool will be configured to support multiple classes; for convenience and space limitations, the depiction of Class 1 and Class 2 Rx buffers are used herein to represent any number of Rx buffer pool classes.

Stations A and B are configured to support bi-directional duplex communication over link 100. As shown, station A transmits a packet stream 110 to station B, while station B transmits a packet stream 112 to station A. The portion of packet stream 110 collectively depicted in FIGS. 1a-1d include the following frames (in order): 1A, Jumbo Frame 1, Jumbo Frame 2, 2A, 3A, Jumbo Frame 3, 4A and 5A. The portion of packet stream 112 collectively depicted in FIGS. 1a-1d include the following frames (in order): Jumbo Frame 5, Jumbo Frame 6, 1B, Jumbo Frame 7, Jumbo Frame 8, 2B, 3B, and Jumbo Frame 9.

The Tx buffers are used to temporarily buffer packetized data that are to be embedded in segments that are transmitted over link 100, such a MAC frames (e.g., Ethernet frames for Ethernet links). At the receiving end, the Rx buffers are used to temporarily buffer packetized data that has been received at a receiver (e.g., an Rx port on an Ethernet NIC or network adaptor) and has been extracted from the received frames. Under one embodiment, each of stations A and B are computers running an operating system with software-based networking facilities. These networking facilities are used for both generating an outbound packet stream and processing a received inbound packet stream. Under one approach, an outbound packet stream is generated by the software-based networking facilitates and stored in system memory. As Tx buffers on the network adaptor or NIC become available, portions of the packet stream are copied from system memory to a corresponding Tx buffer, such as via a direct memory access (DMA) read operation. The portion of the packet stream that is written to the Tx buffer pool is then transmitted via Ethernet frames that are assembled by the network adaptor/NIC.

Under one conventional approach, a Tx buffer pool may be implemented as a First-in, First-out (FIFO) buffer, and is operated such that the order the packetized data is transmitted mirrors the order the packetized data is written to the FIFO. In some instances, a circular FIFO is used, such as illustrated in FIGS. 1a-1d. In cases where larger or multiple Tx buffers are used, a smaller FIFO or the like may be used to store pointers to data stored in separate Tx buffers. In the Rx and Tx buffers shown in the Figures herein, each buffer or "slot" has a size of 1500 bytes, which is the maximum payload size of a conventional Ethernet frame; however, this size is merely exemplary for illustrative purposes. In one embodiment, the size is set by the link parameters, such as 1500 plus a small allocation for protocol overhead (e.g., 1-2%). Jumbo Ethernet frames have a maximum payload of approximately 9K bytes, and thus occupy 6 buffer slots each. Although depicted as occupying more than one buffer slot (so their labels will fit), the conventional frames 1A, 2A, 3A, 4A, 5A, 1B, 2B, and 3B shown herein are actually 1500 bytes or less in size. It will be recognized by those skilled in the art that the size of a buffer slot may be different than 1500 bytes, and the use of 1500 bytes herein is merely exemplary.

The Rx buffers are used to temporarily buffer incoming packets that are conveyed via the Ethernet frames received at a receiver. As the frames arrive, the packetized data is extracted from the frames and written to the Rx buffers during "de-packatizing" operations performed at the MAC layer. As with Tx buffers, the Rx buffers may comprise FIFO buffers, such as circular buffers. Other types of Rx buffers may also be used. Packetized data in the Rx buffers is copied to system memory (e.g., via a DMA write), where the data may be accessed by the receive-side of the software-based networking facilities to perform additional packet processing operations.

As illustrated in FIGS. 1a-1d, each Rx buffer pool class is sized to store two Jumbo frames. This is to address a worst case scenario under which multiple Jumbo frames corresponding to the same class of service may be received back-to-back during a transmission sequence during which a congestion event is detected but a corresponding flow control message may not be transmitted in time to prevent a subsequent Jumbo frame of the same class from being transmitted, causing a buffer overflow.

In the diagrams depicted in FIGS. 1a-1d, packet streams are shown advancing forward through the Tx and Rx buffers. In practice, the data itself does not move within a FIFO buffer, but rather a pair of pointers called head and tail pointers are moved to advance the head of and tail of the buffer to new slot locations. For circular FIFOs, the pointers wraps from the end of the FIFO back to the start of the FIFO in a circular manner, hence the name.

Returning to FIG. 1a, this illustration shows a first point in time at which frame 1A and Jumbo Frame 1 have been transmitted from Station A and received and buffered at station B, and at which point Jumbo Frames 5 and 6 have been transmitted from Station B and received and buffered at Station A. Under the conventional approach, as each 1500 byte portion of payload for a Jumbo frame is written to framing logic in the transmitter, the corresponding buffer slot is flagged as available by advancing the FIFO head and tail pointers. For example, this is depicted in FIG. 1d, wherein approximately half of Jumbo Frame 3 has been transmitted across link 100, and there are only three buffer slots storing packet data to be subsequently added to Jumbo Frame 3. Additionally, once the payload for a Jumbo frame begins to be processed by the framing logic, an entire Jumbo frame worth of payload will be transmitted out without interruption.

Figure 1A:
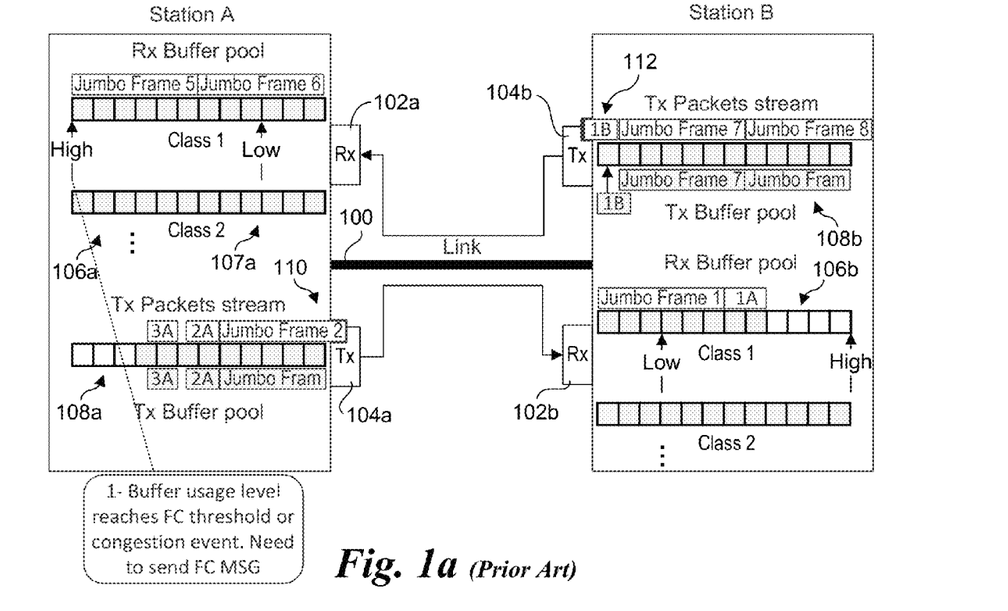
FIGS. 1a-1d collectively illustrate an example of a conventional approach for performing flow control in response to a buffer overfill resulting in dropping of a Jumbo frame.

As shown toward the top of Station A in FIG. 1a, all 12 buffer slots of Class 1 of Rx buffer pool 106a are occupied with payload data from Jumbo Frames 5 and 6. As a result, a high threshold or watermark has been reached. In response, Station A needs to send a flow control (FC) message to Station B to request that Station B temporarily stop transmitting frames to Station A via link 100. Under one approach, flow control is effected by transmitting one or more PAUSE frames until the fill level in Rx buffer pool 106a reaches the low threshold or watermark.

Figure 1B:
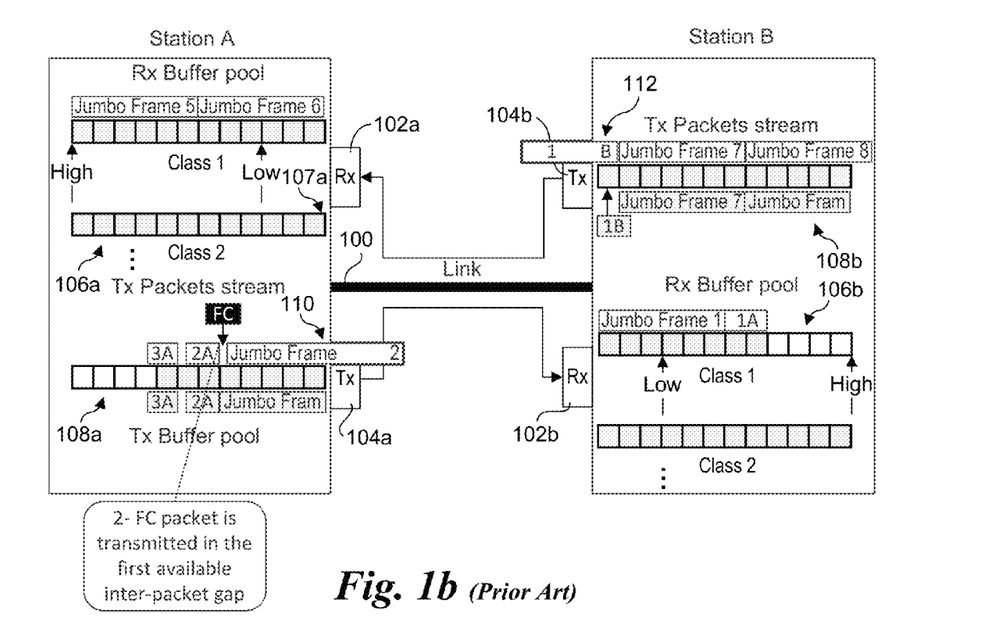

FIG. 1b shows further details relating to transmitting an FC message (as depicted herein by "FC" in white lettering over a black background). Under the illustrated conventional approach, the FC message is transmitted at the first available inter-packet gap. In this case, it will be transmitted after the entire payload for Jumbo Frame 2 has been transmitted out of transmitter 104a.

As further shown in FIG. 1b, there is a finite time delay between when the high threshold is detected and when the logic determines an FC message is to be inserted. During this time, the transmission for the beginning of each of Jumbo Frame 2 and frame 1B is shown advancing towards it applicable receiver (relative to what is illustrated in FIG. 1a). As depicted herein, a portion of a packet stream depicted with a wide outline represents framed packets. In addition, since it would not be possible to show the relative time-scales between the buffer advancement rate and the rate at which data is transmitted over a link (i.e., the speed of light) using the same scale for both within the allowed drawing space, when data is being transmitted over a link the letters used to identify the frames are spread out to indicate the amount of time it takes to traverse a link is extremely small (on the order of nanoseconds).

Figure 1C:
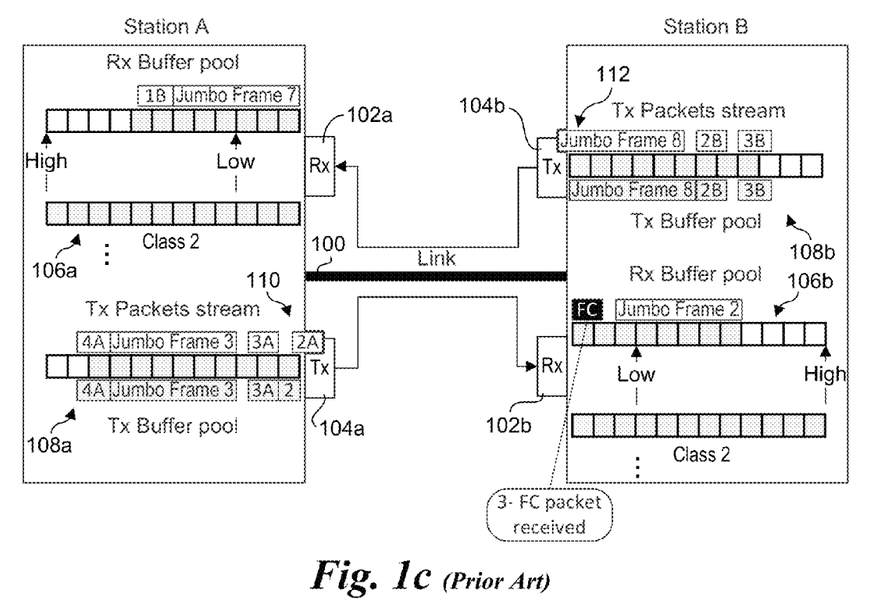
Figure 1D:
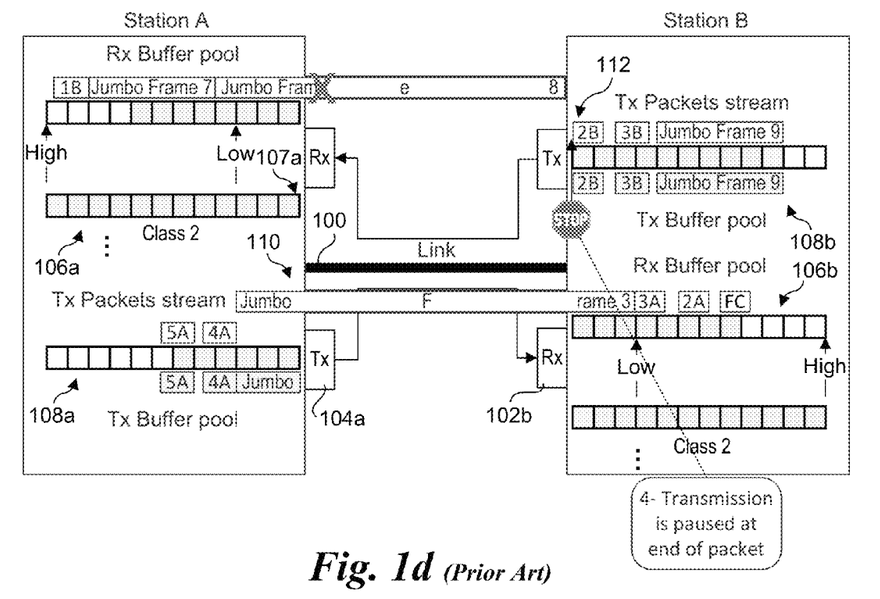

FIG. 1c shows a point in time after which the FC message (e.g., a PAUSE frame) is received and buffered at Station B. As illustrated, the FC message followed transmission of Jumbo Frame 2. Meanwhile, during the timeframe between FIGS. 1b and 1c, Station A has DMA'ed the payload data for Jumbo Frames 5 and 6 to system memory (not shown), received and buffered frame 1B and Jumbo frame 7, and is about to receive Jumbo Frame 8. Also, Station B has begun to transmit Jumbo Frame 8.

As shown in FIG. 1d, under the conventional approach, upon receiving the PAUSE frame Station B will stop transmitting frames at the end of the current frame being transmitted, which in this example is Jumbo Frame 8. During the delay between when the PAUSE frame is received and Station B stops transmitting frames, Jumbo Frame 8 has arrived at receiver 102a and its packet payload begins to be buffered. However, since there is not enough room to fit all of the payload data for frame 1B, Jumbo Frame 7, and Jumbo Frame 8, the entire frame is dropped, since the CRC for the frame can't be performed.

As discussed above, under conventional operations, the transmit-side of a network adaptor or NIC discards buffered packet data for Jumbo frames as soon as the data in a given buffer is forwarded to the framing logic or the until the entire frame is transmitted. In contrast, under the embodiments now described, it is kept for a preset amount of time after the frame has been transmitted. For example, for a Tx FIFO buffer, while packetized payload data for a Jumbo frame is being framed and transmitted out of a transmitter the tail pointer for the Tx FIFO buffer is not advanced until the entire Jumbo frame is transmitted, at which point it is advanced by 6 buffer slots. As a result, the buffer slot(s) used to buffer the packet data corresponding to the current frame (being framed and transmitted) remain flagged as unavailable, preventing these slots from being overwritten with data corresponding to later packets in the transmitted packet streams. This enables transmission of frames to be aborted and then subsequently retransmitted without loss of data. It also enables flow control messages to be immediately transmitted to a link partner by pre-empting transmission of Jumbo frames, as described below.

A first use case of this novel approach is illustrated in FIGS. 2a-2d. In a manner similar to the previous example, data is transferred via a bi-directional duplex link 200 between stations A and B. Each of stations A and B has applicable Transmitter (Tx) and Receiver (Rx) components, as depicted by receivers 202a and 202b, and transmitters 204a and 204b. Each of stations A and B also has an Rx buffer pool with buffers partitioned into multiple classes and a Tx buffer pool, as depicted by Rx buffer pools 206a and 206b and Tx buffer pool 208a and 208b. Station A transmits a packet stream 210 to station B, while station B transmits a packet stream 212 to station A.

As further illustrated in FIGS. 2a-2d, the size of the Rx buffers for each class is reduced relative to the conventional size shown in FIGS. 1a-1d and discussed above. In the illustrated embodiment, the size of the Rx buffer for each class is equal to the size of a Jumbo frame; however, this is exemplary and not meant to be limiting, as other sizes may also be used. As will be demonstrated below, the scheme implemented in FIGS. 2a-2d enables the size of each class of the Rx buffers to be reduced relative to the conventional approach, while still addressing buffer overflow.

Figure 2A:
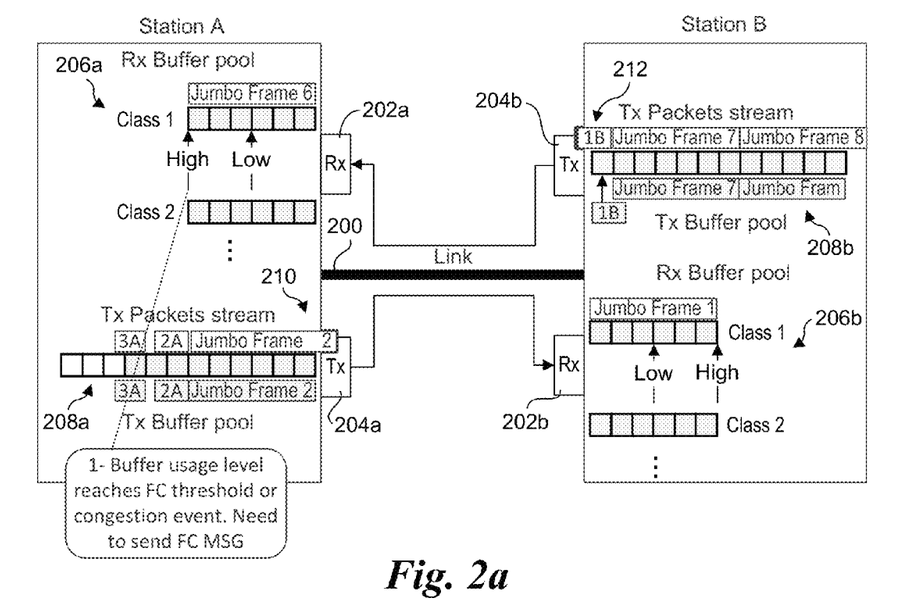
FIGS. 2a-2d collectively illustrate a first use case in accordance with an embodiment of the invention under which flow control messages may pre-empt transmission of Jumbo frames to facilitate faster flow control responses and reduce dropping of frames.

FIG. 2a depicts an initial data transfer condition that is somewhat analogous to that shown in FIG. 1a, except that Class 1 of Rx buffer pool 206 is buffering only Jumbo Frame 6. In a manner similar to that described above for FIG. 1a, Rx buffer pool 206a for station A has reached the high threshold, and needs to send an FC message to station B requesting station B stop sending frames over link 200.

Figure 2B:
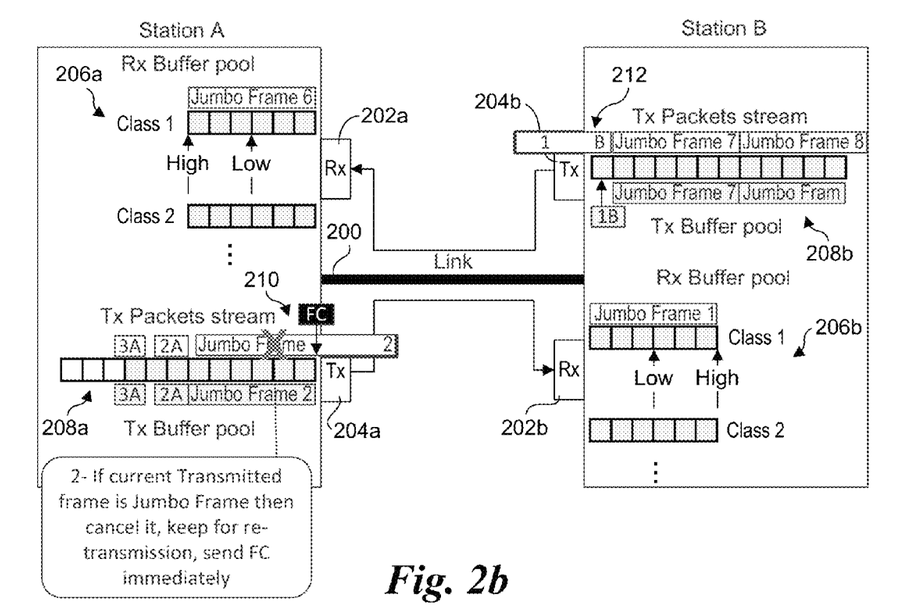

Continuing at FIG. 2b, upon recognizing the high threshold condition, station A is enabled to immediately send an FC message to station B to stop transmitting over link 200. Under the illustrated embodiment, this is accomplished by aborting transmission of Jumbo Frame 2, and immediately sending an FC message (e.g., a PAUSE frame) out of transmitter 204a over link 200. In effect, the transmission of a Jumbo frame is pre-empted in favor of the FC message. Generally, when a Jumbo frame is aborted, the frame's header and a portion of the frame's payload will have already been transmitted. Under one embodiment, in connection with aborting transmission of a Jumbo frame, a frame check sequence cyclic redundancy check (CRC) is appended to the truncated frame and set to a predetermined value or otherwise intentionally set to an incorrect value such that when the truncated Jumbo frame is received, the MAC layer logic in the receiver detects that the frame data is corrupted, and discards the portion of the Jumbo frame that was transmitted before the frame transmission was aborted. In another embodiment, the MAC layer logic is configured to detect that it has received an incomplete frame (e.g., by detecting an incorrect length, detecting a missing frame check sequence CRC, etc.). Prior to sending an FC message, inter-frame gap indicia will also be sent (e.g., 96 bits of idle line state).

Figure 2C:
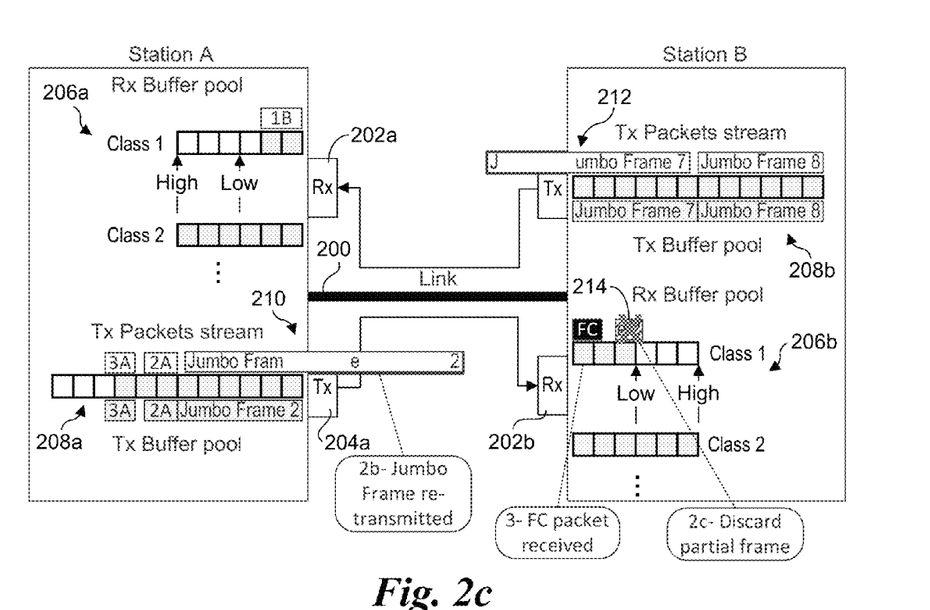

The result of the foregoing operations is illustrated in FIG. 2c, wherein the portion of Jumbo Frame 2 that was transmitted (as identified by reference number 214) is discarded. This portion of the payload data may be discarded by either not writing the data to The Class 1 buffers of Rx buffer pool 208b, or writing the data to Class 1 buffers and marking it as bad (as shown). For example, as a frame is received, its payload data is written to an available Rx buffer on the fly. Since the frame check sequence CRC is at the end of frame, the portion of the payload data that was received prior to calculating the CRC will have already been buffered. Accordingly, this data is marked as corrupted.

Figure 2D:
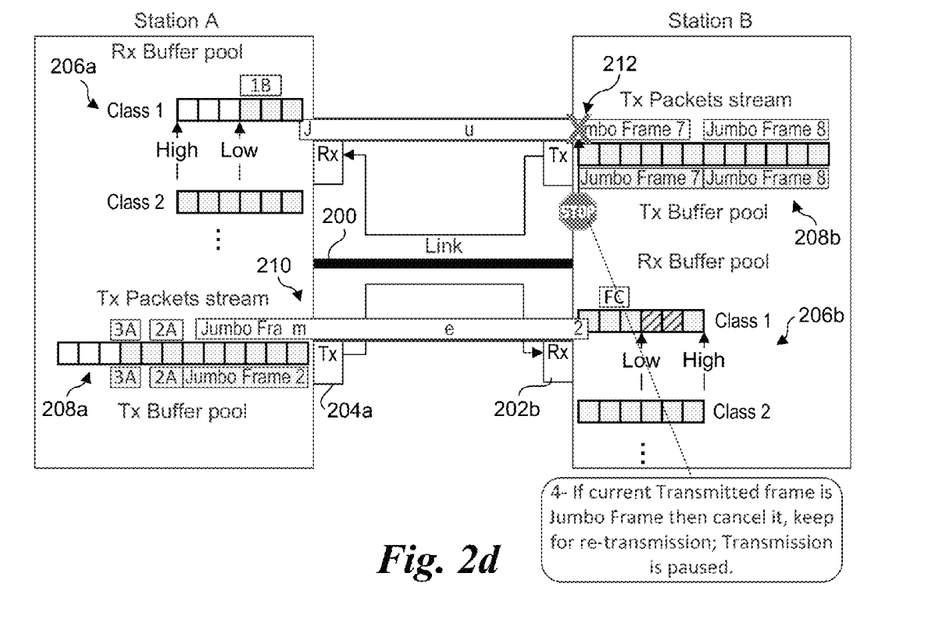

As shown in FIG. 2d, in response to receiving the FC message, if the current transmitted frame is a Jumbo frame, its transmission is immediately paused, causing transmission of the Jumbo frame to be aborted. In one embodiment, if the current transmitted frame is a conventional frame, transmission of the frame is continued until it is completed, at which point transmission will be paused. As before, the truncated portion of the aborted Jumbo frame that has already been sent will be discarded at the receiver side (i.e., when received at receiver 202a of station A).

As discussed above, since none of the payload data for a Jumbo frame is discarded until after the entire frame has been transmitted (or after an additional timeout time), the entirety of the aborted Jumbo frame's data remains buffered. As a result, this data is available for retransmission. In one embodiment, a Jumbo frame that is aborted so that an FC message can be immediately sent is retransmitted following the transmission of the FC message. This result is shown in FIG. 2C, at which point the FC message has been received at receiver 202b of station B and is buffered in the Class 1 buffers of Rx buffer pool 208B, while Jumbo Frame 2 is in flight on link 200. Similarly, upon expiration of the pause duration period identified by the PAUSE frame (or the pause duration period of all PAUSE frames have expired when multiple PAUSE frames are sent in sequence), station B will recommence transmission operations. In one embodiment, upon recommencing transmission following an aborted Jumbo frame in connection with a pause in transmission, the transmitter will retransmit the Jumbo frame.

Under another use case, improved flow control and buffer management is implemented in a switching element such as a switch or router. Under one embodiment, a sending station (e.g., an end station or another switch or router) communicates with the switch/router over a first link. The two link partners use a NACK (Negative ACKnowledgement) feedback scheme that enables the switch/router to inform the sending station that the egress port used to forward the frame is congested or the target station (as identified by the frame's MAC destination address) is temporarily unreachable. Moreover, the NACK feedback scheme is implemented such that a NACK message may cause a Jumbo frame transmitted to the sending station to be pre-empted in favor of a NACK message. Upon receipt of the NACK message, the sending station immediately aborts continued transmission of the frame. Under one embodiment, this approach is augmented such that the transmitter only discards packets after a preset amount of time has passed since the packet's send was completed (on the order of the transmission time for one regular packet). Alternatively, or in addition, transmission for frames forwarding packets of a particular class and/or switch egress port may be temporarily paused, while frames forwarding packets belonging to other class or having destination addresses that are reachable by non-congested egress ports are allowed to jump paused frames.

Figure 3A:
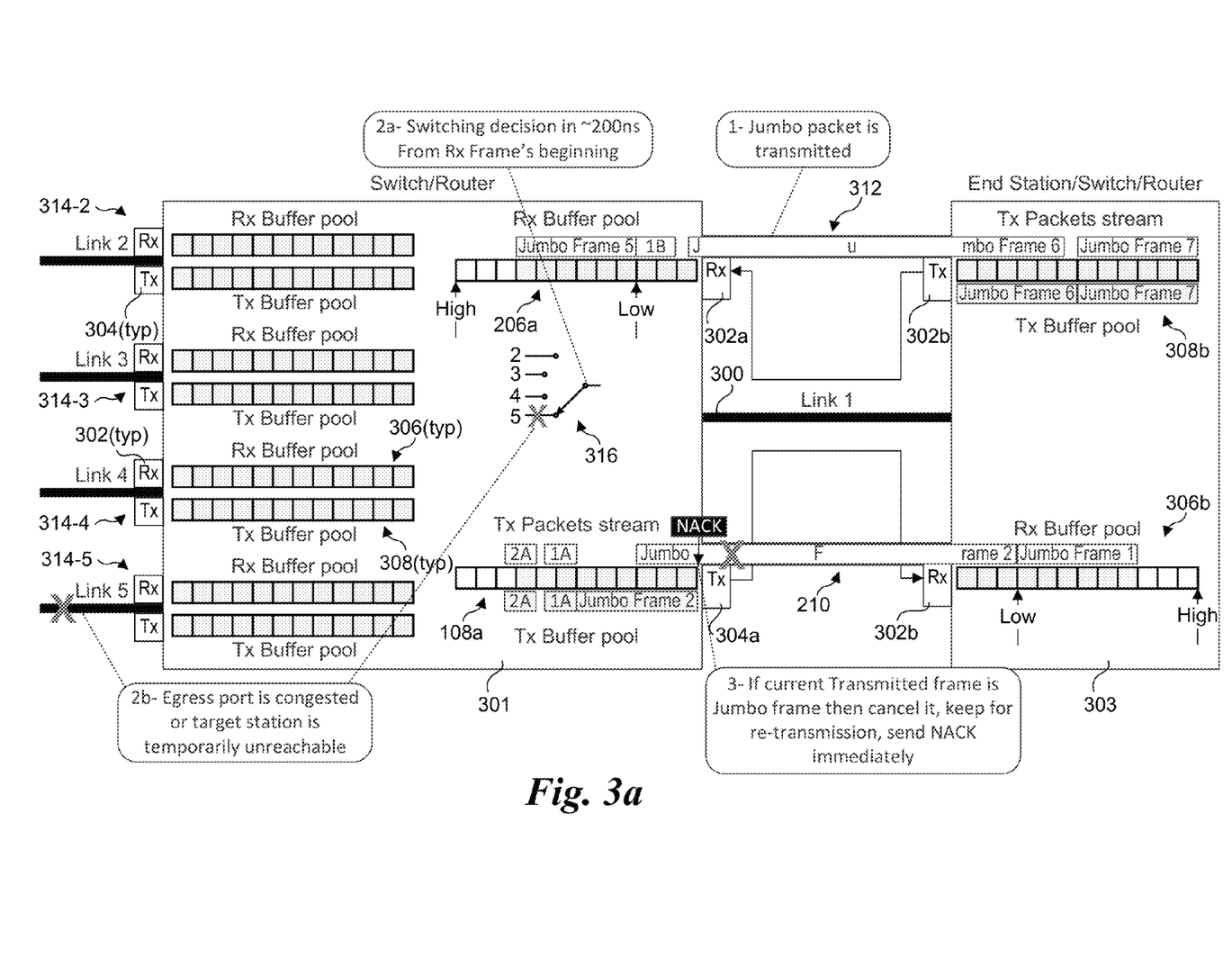
FIGS. 3a-3c collectively illustrate a second use case in accordance with an embodiment of the invention under which a switching element is configured to perform flow control in a manner that facilitates immediate pausing of the transmission of frames that cannot be accepted by the switching element.
Figure 3B:
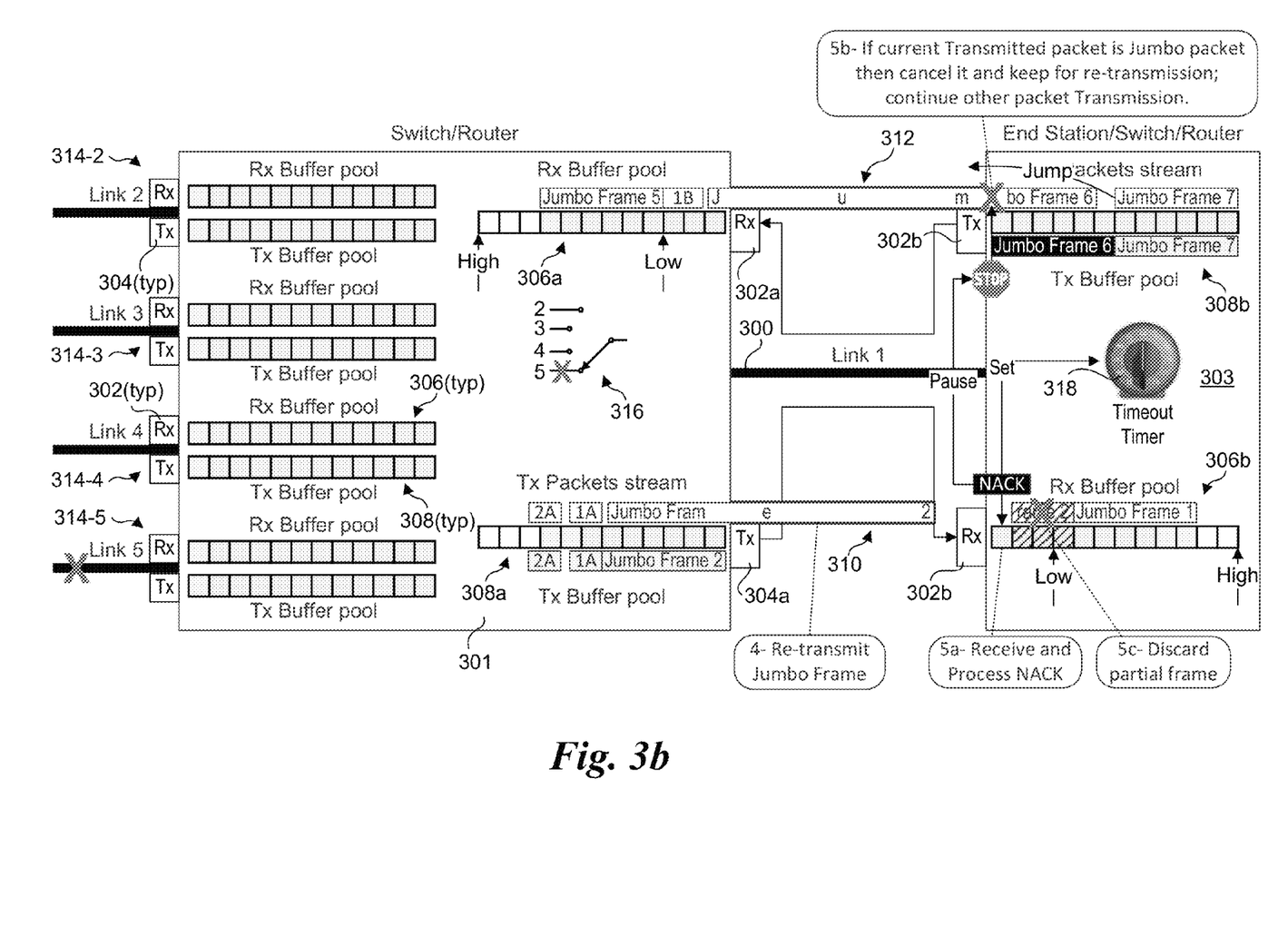
Figure 3C:
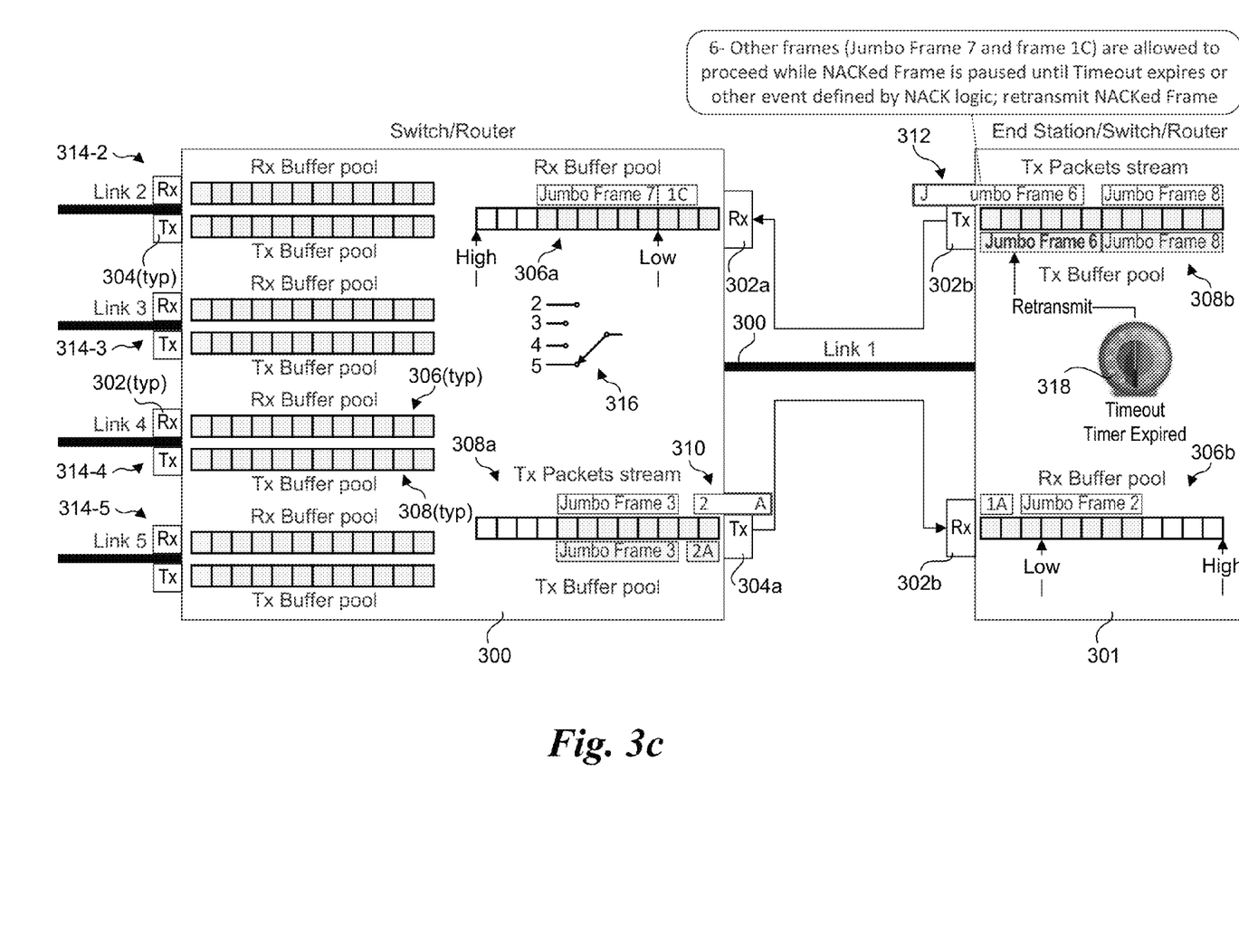

An exemplary implementation of this use case is illustrated in FIGS. 3a-3c. As shown, a switch/router 301 is linked in communication with a sending station 303 comprising one of an end station, or another switch or router via a bi-directional duplex link 300. While referred to herein as a sending station, it is noted that sending station 303 also receives frames from switch/router 301, and the two constitute a pair of link partners similar to stations A and B discussed above.

As before, the two link partners include applicable receiver and transmitter components, as depicted by receivers 302a and 302b and transmitters 304a and 304b. Sending station 303 includes a Tx buffer pool 306b and an Rx buffer pool 308b, and transmits a Tx packet stream 312 to switch/router 301 and receives a Tx packet stream 310 from switch/router 301.

Switch/router 301 includes an Rx buffer pool 306a and a Tx buffer pool 306b. It also includes a set of networking components and buffers 314 for each of four links 2, 3, 4, and 5, as depicted as component sets 314-2, 314-3, 314-4 and 314-5. Each of these component sets includes a receiver 302, a transmitter 304, an Rx buffer pool 306 and a Tx buffer pool 308. Switch/router 301 further includes switching logic for forwarding received frames via applicable egress ports. For frames received via link 300, the switching logic is depicted as a four-position switch 316. In addition, switch/router 301 may include additional buffer pools (not shown), such as per-class buffer pools and/or shared buffer pools. Moreover, the Rx and Tx buffer pools for a switch/router may be larger than corresponding Rx and Tx buffer pools for an end station.

At the state shown in FIG. 3a, a Jumbo Frame 5 and a frame 1B has been received an buffered in Rx buffer pool 306a, and a Jumbo Frame 6 has been transmitted from sending station 303 with the frame header just being received at switch/router 301. In addition, sending station 303 has received and buffered a Jumbo Frame 1, and has received and buffered approximately half of a Jumbo Frame 2. As further illustrated by Tx buffer pool 308a, switch/router is configured to not discard packet data for any portion of a Jumbo frame until an entire Jumbo frame has been transmitted out of transmitter 304a. For instance, although half of Jumbo Frame 2 has been transmitted, all six buffer slots for the frame's packet data remain marked as unavailable.

In response to receiving the frame header for Jumbo Frame 5, the MAC destination address is immediately inspected and a switching decision is made by router/switch 301 that the frame is to be forwarded via link 5. In one embodiment, this switching decision takes approximately 200 nanoseconds after the first portion of a frame is received. In the illustrated example, either the egress Tx port for link 5 is not available due to link congestion or the target station (not shown) at the other end of link 5 is temporarily unreachable. In one embodiment, the switching logic (or other logic) also determines there is no buffer space available for Jumbo Frame 6 (e.g., using a shared buffer pool or per-class buffer pool), or otherwise determines the priority of the class corresponding to Jumbo Frame 6 does not meet applicable buffer usage criteria for accepting the frame.

As a result of the foregoing operations, the logic in switch/router 301 determines that Jumbo Frame 6 is to be dropped. In connection with this determination, if the current transmitted (to sending station 303 via link 300) frame is a Jumbo frame, transmission of Jumbo Frame 2 is immediately aborted, and a NACK message is sent to sending station 303. As none of the buffered data for Jumbo Frame 2 has been discarded at this point, Jumbo Frame 2 is available for retransmission.

Continuing at FIG. 3b, at this state the NACK message has been received at sending station 303. In addition, Jumbo Frame 4 has been retransmitted (in its entirety) following transmission of the NACK message. Generally, a NACK message contains a negative acknowledgement relating to a corresponding frame that identifies the frame and contains information indicating the frame was not successfully transmitted (or was otherwise discarded). In one embodiment, the NACK message also contains a timeout value requesting the receiving unit (of the NACK) to either not retransmit the frame identified by the NACK message or not send any additional frames having the same MAC destination address as that contained in the discarded frame. Depending on whether sending station 303 is another switch or router and the sophistication of the logic used by the implementation, sending station may be configured to determine that Jumbo Frame 6 was destined to be forwarded via (unavailable) link 5, and that the NACK timeout is applicable to any frames destined to be forwarded via link 5. Optionally, the NACK timeout may be implemented on a per-class basis. As yet another option, the NACK message does not include a timeout value, but merely identifies transmission of the Jumbo frame was not successful.

As depicted toward the upper right portion of FIG. 3b, in response to processing the NACK message, transmission of Jumbo Packet 6 is immediately aborted. In embodiments where a timeout is used, a timeout timer 318 on sending station 303 is set to the timeout value in the NACK message and started. FIG. 3b further depicts that the portion of Jumbo Frame 2 that had previously been received and buffered is discarded.

While transmission of Jumbo Frame 6 has been aborted, the entirety of its packet data is still buffered in Tx buffer pool 208b and available for retransmission. However, under the NACK timeout technique, it may not be retransmitted until after timeout timer 318 has expired. Optionally, under a NACK scheme that doesn't employ a specified (in the NACK message) timeout value, an aborted Jumbo frame may not be re-transmitted until a predetermined time has expired, or based on other predefined criteria. In the meanwhile, other frames are made available for transmission from sending station 303. In effect, these frames are allowed to jump the paused Jumbo frame corresponding to the NACK message.

FIG. 3c shows the state after which a Jumbo Frame 7 and a frame 1C have jumped paused Jumbo Frame 6 and been transmitted from sending station 303 and received and buffered by switch router 301. In addition, at this state timeout timer 318 has expired. Thus, Jumbo Frame 6 is made available for re-transmission, and is re-transmitted following completion of any frame that was currently being transmitted when timeout timer 318 expired. More generally, when a NACK is received identifying a target station that is unavailable, other packets may be transmitted if their target stations are not the same as the unavailable target station.

While the foregoing NACK technique is illustrated by way of example for use with Jumbo frames, this is not meant to be limited to Jumbo frames. Rather, this technique may be implemented with substantially any packet size or data segmentation scheme.

Figure 4:
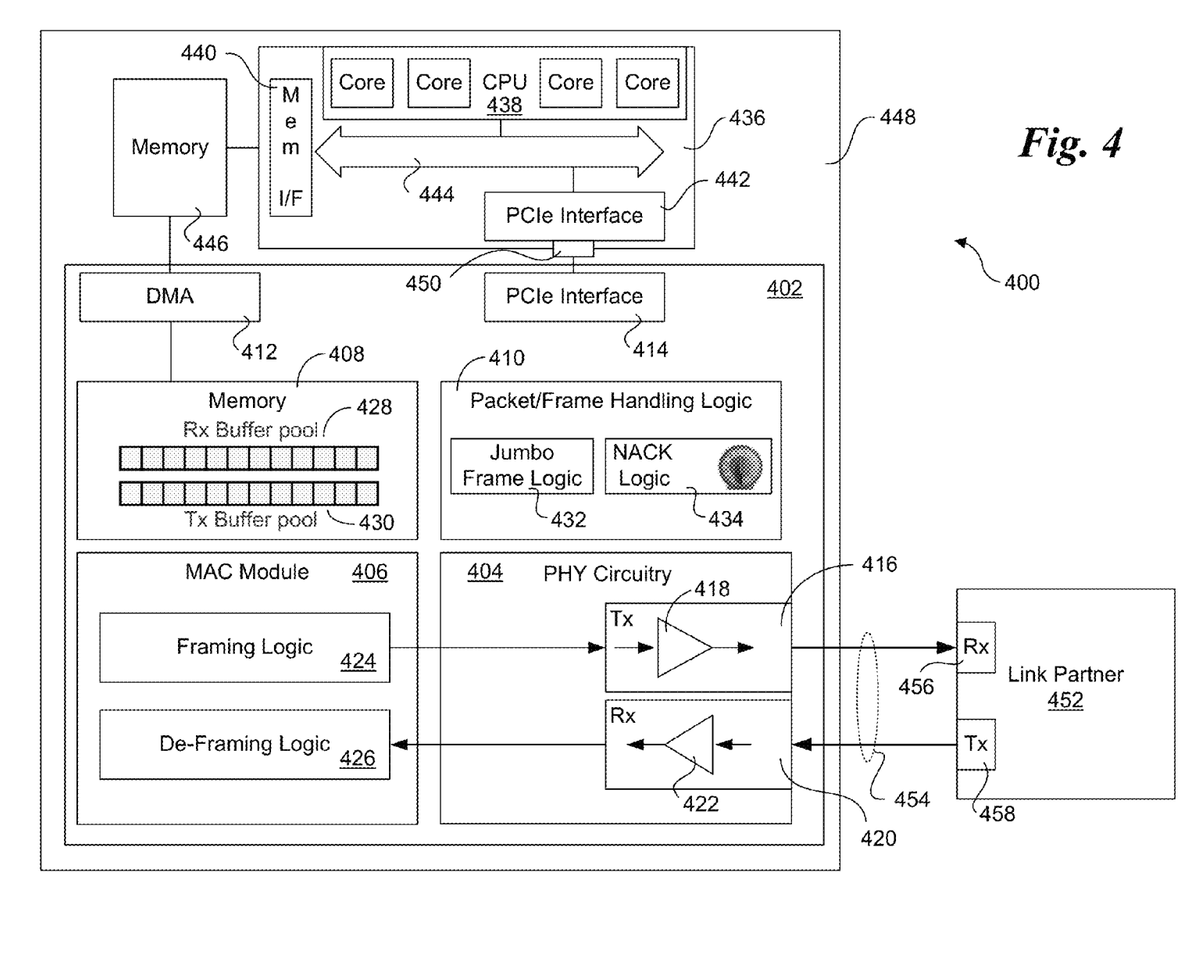
FIG. 4 is a schematic diagram illustrating an architecture for an exemplary network station configured to implement aspects of the embodiments disclosed herein.

FIG. 4 shows an exemplary architecture for a network station 400 employing an apparatus comprising a network adaptor or NIC chip 402 including transmitter circuitry configured to implement aspects of the embodiments disclosed herein. Network adaptor/NIC chip 402 includes PHY circuitry 404, a MAC module 406, memory 408, packet and frame handling logic 410, a DMA interface 412 and a Peripheral Component Interconnect Express (PCIe) interface 414. PHY circuitry 404 comprises a transmitter port 416 including transmitter circuitry 418 and a receiver port 420 including receiver circuitry 422. MAC module 406 includes framing logic 424 and de-framing logic 426. Memory 408 is configured during operation to include an Rx buffer pool 428 and a Tx buffer pool 430. Packet and frame logic 410 generally includes logic for handling packets and frames. In addition to conventional packet and frame handling logic (not shown), packet and frame handling logic 410 includes Jumbo frame logic 432 and NACK logic 434.

In the illustrated embodiment, network station 400 also includes a System on a Chip (SoC) 436 including a Central Processing Unit (CPU) 438 having one or more processor cores, coupled to a memory interface 440 and a PCIe interface 442 via an interconnect 444. Memory interface 440 is further depicted as being coupled to memory 446. Under a typical configuration, Network adaptor/NIC chip 402, SoC 436 and memory 446 will be mounted on or otherwise operatively coupled to a circuit board 448 that includes wiring traces for coupling these components in communication, as depicted by single lines connecting DMA 412 to memory 446 and PCIe interface 414 to PCIe interface 442 at a PCIe port 450.

Network station 400 is further depicted as being linked in communication to a link partner 452 via an Ethernet link 454. Link partner is depicted as only including an Rx port 456 and a Tx port 458 for simplicity. In one embodiment, each of network station 400 and link partner 452 have similar configurations. More generally, network station 400 is illustrative of various types of network devices and computer systems that may be linked in communication via Ethernet links, including but not limited to end stations and switching elements such as Ethernet switches and routers.

Aspects of the architecture illustrated for network station 400 may be implemented in a network switching element such as a switch or router. In some embodiments, a switching element will employ embedded logic facilitated through use of a microcontroller or network processor or the like, rather than a multi-core processor such as depicted by SoC 436. In addition, although depicted in a separate block, all or a portion of packet and frame handling logic may be implemented in a MAC module, or may be implemented in combination with other logic blocks that are not shown in FIG. 4. More generally, the logic for implementing aspects of the embodiments disclosed herein may be distributed such that it is implemented by as apparatus as a whole, rather than be a specific block of logic in an apparatus. Accordingly, as used in the claims herein, either an apparatus or a particular block of logic may be configured to implement corresponding operations.

In one embodiment, Network adaptor/NIC chip 402 comprises a 10 Gbps Ethernet Network Interface Controller (NIC) chip. However, the circuitry and components of Network adaptor/NIC chip 402 may also be implemented in other types of chips and components, including SoCs, multi-chip modules, and NIC chips including support for multiple network interfaces (e.g., wired and wireless).

In addition, embodiments of the present description may be implemented not only within a semiconductor chip such as a NIC, but also within non-transient machine-readable media. For example, the designs described above may be stored upon and/or embedded within non-transient machine readable media associated with a design tool used for designing semiconductor devices. Examples include a netlist formatted in the VHSIC Hardware Description Language (VHDL) language, Verilog language or SPICE language, or other Hardware Description Language. Some netlist examples include: a behavioral level netlist, a register transfer level (RTL) netlist, a gate level netlist and a transistor level netlist. Machine-readable media also include media having layout information such as a GDS-II file. Furthermore, netlist files or other machine-readable media for semiconductor chip design may be used in a simulation environment to perform the methods of the teachings described above.

The flow control management and frame handling techniques disclosed herein provide significant advantages over conventional approaches. By pre-empting transmission of Jumbo frames in favor of immediately sending flow control messages, a link partner will be informed much earlier than the conventional approach to pause transmission of frames. This will result in a reduction of frames having to be dropped and/or enables the size of the buffer pools to be reduced since the design no longer has to account for a worst case scenario under which a flow control message will not be transmitted until after the completion of transmission of a current Jumbo frame. Moreover, since the entire content of Jumbo frames are buffered until transmission of frames out of a transmitter is complete (or optionally using an time offset), Jumbo frames are available for retransmission. Additionally, the operation of switching elements may be enhanced using the disclosed techniques. For example, by inspecting the headers of frames upon being received, a determination can be made very early on to whether the frame can be handled by the switch or will be discarded. If the frame is to be discarded, the sending station can be immediately requested to pause transmission of the frame. Again, since the entirety of the frame data remains buffered, the frame can be retransmitted when applicable.

While some embodiments herein depict the use of Jumbo frames or Ethernet frames, the teachings and principles disclosed herein are not limited to these examples. Rather, flow control techniques under which transmission of a currently transmitted data segment (or data unit) is preempted in favor of a flow control message and wherein the data corresponding to data segments (or data units, as applicable) such as frames is buffered in its entirety until after the data segment has been transmitted may be practiced using various types of data transmission protocols in addition Ethernet.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As discussed above, various aspects of the embodiments herein may be facilitated by corresponding software and/or firmware components and applications, such as software running on a server or firmware executed by an embedded processor on a network element. Thus, embodiments of this invention may be used as or to support a software program, software modules, firmware, and/or distributed software executed upon some form of processing core (such as the CPU of a computer, one or more cores of a multi-core processor), a virtual machine running on a processor or core or otherwise implemented or realized upon or within a machine-readable medium. A machine-readable medium includes any mechanism for storing or transmitting information in a form readable by a machine (e.g., a computer). For example, a machine-readable medium may include a read only memory (ROM); a random access memory (RAM); a magnetic disk storage media; an optical storage media; and a flash memory device, etc.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method, comprising:
    initiating transmission of a first Ethernet frame from a first station to a second station via an Ethernet link coupled between the first and second stations;
    receiving Ethernet frames transmitted from the second station to the first station via the Ethernet link;
    detecting a first flow control event at the first station while the first Ethernet frame is being transmitted; and in response thereto,
        aborting transmission of the first Ethernet frame;
        sending a first flow control message from the first station to the second station requesting the second station to pause sending data via the Ethernet link; and
        retransmitting the first Ethernet frame from the first station to the second station.

2. The method of claim 1, wherein detecting a flow control event comprises detecting that a buffered amount of data received from a second station via the Ethernet link has reached or exceeded a threshold.

3. The method of claim 1, wherein the first Ethernet frame comprises a Jumbo frame, the method further comprising:
    initiating transmission of a second Ethernet frame from the first station to the second station via the Ethernet link;
    receiving Ethernet frames transmitted from the second station to the first station via the Ethernet link;
    detecting a second flow control event at the first station while the second Ethernet frame is being transmitted; and in response thereto,
        determining the second Ethernet frame is not a Jumbo frame;

completing transmission of the second Ethernet frame; and sending a second flow control message from the first station to the second station following completion of transmission of the second Ethernet frame requesting the second station to pause sending data via the Ethernet link.

4. The method of claim 1, wherein aborting transmission of the first Ethernet frame comprises truncating a payload of the first Ethernet frame and adding indicia to the first Ethernet frame indicating it is to be discarded.

5. The method of claim 1, further comprising:
receiving a third flow control message at the first station sent from the second station requesting the first station pause transmission to the second station via the Ethernet link, the flow control message being received while a third Ethernet frame is being transmitted from the first station to the second station via the Ethernet link;
aborting transmission of the third Ethernet frame;
temporarily pausing transmission of data from the first station to the second station via the Ethernet link; and
retransmitting the third Ethernet frame from the first station to the second station.

6. The method of claim 5, wherein the third Ethernet frame comprises a Jumbo frame, the method further comprising:
receiving a fourth flow control message at the first station sent from the second station requesting the first station pause transmission to the second station via the Ethernet link, the flow control message being received while a fourth Ethernet frame is being transmitted from the first station to the second station via the Ethernet link;
determining the fourth Ethernet frame is not a Jumbo frame;
completing transmission of the fourth Ethernet frame; and
temporarily pausing transmission of data from the first station to the second station via the Ethernet link.

7. The method of claim 1, further comprising maintaining packet data corresponding to an entirety of a Jumbo frame payload in a transmit buffer until an entirety of the Jumbo frame is transmitted.

8. The method of claim 1, further comprising maintaining packet data corresponding to an entirety of a Jumbo frame payload in a transmit buffer until a predetermined delay after an entirety of the Jumbo frame is transmitted.

9. The method of claim 1, further comprising:
transmitting a fifth Ethernet Frame to a switching element;
receiving a flow control message from the switching element requesting transmission of the fifth Ethernet frame be paused; and in response thereto,
aborting transmission of the fifth Ethernet frame;
transmitting at least one other Ethernet frame to the switching element; and
retransmitting an entirety of the fifth Ethernet frame following transmission of the at least one other Ethernet frame to the switching element.

10. An apparatus, comprising:
an interface to Physical Layer (PHY) circuitry including a transmitter port including transmitter circuitry and a receiver port including receiver circuitry;
a Media Access Control (MAC) module including framing logic and deframing logic,
memory, configured, upon operation of the apparatus, to include a receiver buffer pool and a transmit buffer pool; and
packet and frame handling logic, configured, upon operation of the apparatus, to, initiate transmission of a first Ethernet frame from the transmitter port to a link partner via an Ethernet link coupled between the apparatus and the link partner;
receive Ethernet frames at the receiver port transmitted from the link partner via the Ethernet link;
detect a first flow control event at the apparatus while the first Ethernet frame is being transmitted; and in response thereto,
abort transmission of the first Ethernet frame;
send a first flow control message to the link partner requesting the link partner to pause sending data via the Ethernet link; and
retransmit the first Ethernet frame to the link partner.

11. The apparatus of claim 10, wherein the first Ethernet frame comprises a Jumbo frame, and wherein upon operation of the apparatus the packet and frame handling logic is further configured to:
initiate transmission of a second Ethernet frame from the apparatus to the link partner via the Ethernet link;
receive Ethernet frames transmitted from the link partner to the apparatus via the Ethernet link;
detect a second flow control event at the apparatus while the second Ethernet frame is being transmitted; and in response thereto,
determine the second Ethernet frame is not a Jumbo frame;
complete transmission of the second Ethernet frame; and
send a second flow control message from the apparatus to the link partner following completion of transmission of the second Ethernet frame requesting the link partner to pause sending data via the Ethernet link.

12. The apparatus of claim 10, wherein aborting transmission of the first Ethernet frame comprises truncating a payload of the first Ethernet frame and adding indicia to the first Ethernet frame indicating it is to be discarded by the link partner.

13. The apparatus of claim 10, wherein upon operation of the apparatus the packet and frame handling logic is further configured to:
receive a third flow control message at the apparatus sent from the link partner requesting the apparatus pause transmission to the link partner via the Ethernet link, the flow control message being received while a third Ethernet frame is being transmitted from the apparatus to the link partner via the Ethernet link;
abort transmission of the third Ethernet frame;
temporarily pause transmission of data from the apparatus to the link partner via the Ethernet link; and
retransmit the third Ethernet frame from the apparatus to the link partner.

14. The apparatus of claim 13, wherein the third Ethernet frame comprises a Jumbo frame, and wherein upon operation of the apparatus the packet and frame handling logic is further configured to:
receive a fourth flow control message at the apparatus sent from the link partner requesting the apparatus pause transmission to the link partner via the Ethernet link, the flow control message being received while a fourth Ethernet frame is being transmitted from the apparatus to the link partner via the Ethernet link;
determine the fourth Ethernet frame is not a Jumbo frame;
complete transmission of the fourth Ethernet frame; and
temporarily pause transmission of data from the apparatus to the link partner via the Ethernet link.

15. The apparatus of claim 10, wherein upon operation of the apparatus the packet and frame handling logic is further configured to maintain packet data corresponding to an entirety of a Jumbo frame payload in the transmit buffer pool until an entirety of the Jumbo frame is transmitted.

16. The apparatus of claim 10, wherein upon operation of the apparatus the packet and frame handling logic is further configured to maintain packet data corresponding to an entirety of a Jumbo frame payload in the transmit buffer pool until a predetermined delay after an entirety of the Jumbo frame is transmitted.

17. The apparatus of claim 10, wherein upon operation of the apparatus the packet and frame handling logic is further configured to:
    transmit a fifth Ethernet Frame to a switching element;
    receive a flow control message from the switching element requesting transmission of the fifth Ethernet frame be paused; and in response thereto,
    abort transmission of the fifth Ethernet frame;
    transmit at least one other Ethernet frame to the switching element; and
    retransmit an entirety of the fifth Ethernet frame following transmission of the at least one other Ethernet frame to the switching element.

18. The apparatus of claim 10, wherein the apparatus comprises one of a network adaptor or network interface controller configured to be installed in a host computer system, the apparatus further comprising:
    the PHY circuitry including the transmitter port including the transmitter circuitry and the receiver port including the receiver circuitry;
    a direct memory access (DMA) engine, configured to transfer data between memory in the host computer system and the memory on the apparatus; and
    a Peripheral Control Interconnect Express (PCIe) interface, configured to interface with a PCIe interface on the host computer system.

19. A method, comprising:
    receiving a first Ethernet frame at a switching element transmitted from a sending station via an Ethernet link coupled between the switching element and the sending station;
    transmitting a second Ethernet frame from the switching element to the sending station via the Ethernet link while the first Ethernet frame is being received at the switching element;
    determining the switching element cannot accept the first Ethernet frame;
    aborting transmission of the second Ethernet frame being transmitted from the switching element to the sending station; and
    sending a first flow control message from the switching element to the sending station requesting the sending station to pause transmission of the first Ethernet frame.

20. The method of claim 19, wherein determining the switching element cannot accept the first Ethernet frame comprises:
    inspecting a Media Access Control (MAC) destination address in a frame header of the first Ethernet frame, the MAC destination address corresponding to a target station to which the Ethernet Frame is to be forwarded; and
    determining one of an egress port via which the Ethernet Frame would be forwarded to the target station is congested or the target station is temporarily unreachable.

21. The method of claim 20, wherein the determination that the switching element cannot accept the first Ethernet frame is made within approximately 200 nanoseconds of receiving a start of the first Ethernet frame.

22. The method of claim 19, further comprising retransmitting the second Ethernet frame in its entirety after sending the first flow control message.

23. The method of claim 19, wherein the current Ethernet frame being transmitted from the switching element to the sending station comprises a Jumbo frame, the method further comprising:
    receiving a third Ethernet frame at the switching element transmitted from the sending station via the Ethernet link;
    inspecting a frame header of the third Ethernet frame and determining the switching element cannot accept the third Ethernet frame;
    determining that a current Ethernet frame being transmitted from the switching element to the sending station while the second Ethernet frame is being received from the sending station is not a Jumbo frame;
    completing transmission of the current Ethernet frame from the switching element; and
    sending a second flow control message from the switching element to the sending station requesting the sending station to pause transmission of the first Ethernet frame.

24. The method of claim 19, wherein the first Ethernet frame comprises a Jumbo frame, the method further comprising:
    receiving a fourth Ethernet frame at the switching element transmitted from the sending station via the Ethernet link;
    inspecting a frame header of the fourth Ethernet frame and determining the switching element cannot accept the fourth Ethernet frame;
    determining the fourth Ethernet frame is not a Jumbo frame; and
    dropping the fourth Ethernet frame at the switching element.

25. The method of claim 19, wherein the first flow control message comprises a NACK (Negative ACKnowledgement) message.

26. An apparatus, comprising:
    a plurality of Ethernet ports, each Ethernet port including,
        a transmitter port;
        a receiver port;
        a transmit buffer pool;
        a receiver buffer pool; and
        packet and frame handling logic;
    switch logic, configured to forward packetized data between the plurality of Ethernet ports;
    wherein upon operation of the apparatus, the apparatus is configured to,
        receive a first Ethernet frame transmitted from a sending station via an Ethernet link;
        transmit a second Ethernet frame from the apparatus to the sending station via the Ethernet link while the first Ethernet frame is being received at the switching element;
        determine the apparatus cannot accept the first Ethernet frame;
        abort transmission of the second Ethernet frame being transmitted from the apparatus to the sending station; and
        send a first flow control message from the apparatus to the sending station requesting the sending station to pause transmission of the first Ethernet frame.

27. The apparatus of claim 26, wherein apparatus is configured to determine it cannot accept the first Ethernet frame by performing operations comprising:

inspecting a Media Access Control (MAC) destination address in a frame header of the first Ethernet frame, the MAC destination address corresponding to a target station to which the Ethernet Frame is to be forwarded; and determining one of an egress port via which the Ethernet Frame would be forwarded to the target station is congested or the target station is temporarily unreachable.

28. The apparatus of claim 27, wherein the apparatus is configured to determine it cannot accept the first Ethernet frame within approximately 200 nanoseconds of receiving a start of the first Ethernet frame.

29. The apparatus of claim 26, wherein upon operation of the apparatus the apparatus is further configured to retransmit the second Ethernet frame in its entirety after sending the first flow control message.

30. The apparatus of claim 26, wherein the second Ethernet frame being transmitted from the apparatus to the sending station comprises a Jumbo frame, and wherein upon operation of the apparatus the apparatus is further configured to:

receive a third Ethernet frame transmitted from the sending station via the Ethernet link;

inspect a frame header of the third Ethernet frame and determine the third Ethernet frame is a Jumbo frame and the apparatus cannot accept the third Ethernet frame;

determine that a current Ethernet frame being transmitted from the apparatus to the sending station while the third Ethernet frame is being received from the sending station is not a Jumbo frame;

complete transmission of the current Ethernet frame from the apparatus; and send a second flow control message from the apparatus to the sending station requesting the sending station to pause transmission of the third Ethernet frame.

31. The apparatus of claim 26, wherein the first Ethernet frame comprises a Jumbo frame, and wherein upon operation of the apparatus the apparatus is further configured to:

receive a fourth Ethernet frame transmitted from the sending station via the Ethernet link;

inspect a frame header of the fourth Ethernet frame and determining the apparatus cannot accept the fourth Ethernet frame;

determine the fourth Ethernet frame is not a Jumbo frame; and drop the fourth Ethernet frame.

32. The apparatus of claim 26, wherein the first flow control message comprises a NACK (Negative ACKnowledgement) message.

* * * * *